(12) United States Patent
Nystad et al.

(10) Patent No.: US 8,681,168 B2
(45) Date of Patent: Mar. 25, 2014

(54) METHODS OF AND APPARATUS FOR PROCESSING GRAPHICS

(75) Inventors: Jørn Nystad, Trondheim (NO); Frank Langtind, Tiller (NO); Joe Tapply, Cambridge (GB); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 979 days.

(21) Appl. No.: 12/686,187

(22) Filed: Jan. 12, 2010

(65) Prior Publication Data

US 2010/0177105 A1    Jul. 15, 2010

(30) Foreign Application Priority Data

Jan. 15, 2009  (GB) .................................. 0900700.6

(51) Int. Cl.
*G09G 5/00* (2006.01)
(52) U.S. Cl.
USPC ........................................................ 345/581
(58) Field of Classification Search
USPC ........................................................ 345/581
See application file for complete search history.

(56) References Cited

U.S. PATENT DOCUMENTS

| | | | |
|---|---|---|---|
| 5,305,430 A | 4/1994 | Glassner | |
| 5,392,385 A | 2/1995 | Evangelisti et al. | |
| 5,500,928 A | 3/1996 | Cook et al. | |
| 5,509,110 A | 4/1996 | Latham | |
| 5,522,018 A | 5/1996 | Takeda et al. | |
| 5,574,836 A | 11/1996 | Broemmelsiek | |
| 5,596,685 A | 1/1997 | Ashton | |
| 5,729,672 A | 3/1998 | Ashton | |
| 5,794,017 A | 8/1998 | Evans et al. | |
| 5,844,571 A | 12/1998 | Narayanaswami | |
| 5,886,701 A | 3/1999 | Chauvin et al. | |
| 5,949,428 A | 9/1999 | Toelle et al. | |
| 6,204,856 B1 | 3/2001 | Wood et al. | |
| 6,288,722 B1 | 9/2001 | Narayanaswami | |
| 6,326,964 B1 | 12/2001 | Snyder et al. | |

(Continued)

FOREIGN PATENT DOCUMENTS

| | | |
|---|---|---|
| CN | 1421002 A | 5/2005 |
| CN | 1641702 | 7/2005 |

(Continued)

OTHER PUBLICATIONS

English translation of Chinese official action, Sep. 23, 2011, in corresponding Chinese application No. 2007-10306692.2.

(Continued)

*Primary Examiner* — Xiao M. Wu
*Assistant Examiner* — Scott E Sonners
(74) *Attorney, Agent, or Firm* — Nixon & Vanderhye P.C.

(57) ABSTRACT

In a tile-based graphics processor, primitive lists (bins) are prepared for 2×2 blocks of tiles 40. The processor also determines and stores for each primitive in a bin, distribution information indicating the distribution of the primitive within the set of tiles that the bin corresponds to. Thus a primitive 42 that is found by its bounding box 43 to reside in two of the four tiles that make up the set of 2×2 tiles 40 is also associated with a tile coverage bitmap of the form "0101" to indicate that it lies in tiles "1" and "3" of the 2×2 group of tiles 40. The graphics processor uses the coverage bitmap (information) to determine whether a primitive should be processed for the tile currently being processed.

20 Claims, 4 Drawing Sheets

(56) References Cited

U.S. PATENT DOCUMENTS

| | | |
|---|---|---|
| 6,344,852 B1 | 2/2002 | Zhu et al. |
| 6,552,723 B1 | 4/2003 | Duluk et al. |
| 6,697,063 B1 | 2/2004 | Zhu |
| 6,798,410 B1 | 9/2004 | Redshaw et al. |
| 6,911,985 B1 | 6/2005 | Fujimoto |
| 7,002,571 B2 | 2/2006 | Lake et al. |
| 7,138,998 B2 | 11/2006 | Forest et al. |
| 7,148,890 B2 | 12/2006 | Rice et al. |
| 7,167,171 B2 | 1/2007 | Heim et al. |
| 7,324,115 B2 | 1/2008 | Fraser |
| 2003/0142100 A1 | 7/2003 | Lavelle et al. |
| 2003/0151608 A1 | 8/2003 | Chung et al. |
| 2003/0227457 A1 | 12/2003 | Pharr et al. |
| 2004/0095343 A1 | 5/2004 | Forest et al. |
| 2004/0207642 A1 | 10/2004 | Crisu et al. |
| 2004/0227767 A1 | 11/2004 | Baroncelli et al. |
| 2006/0072831 A1 | 4/2006 | Pallister |
| 2007/0101013 A1 | 5/2007 | Howson |
| 2007/0146378 A1* | 6/2007 | Sorgard et al. ............ 345/581 |
| 2007/0165035 A1 | 7/2007 | Duluk et al. |
| 2008/0012878 A1 | 1/2008 | Nystad et al. |
| 2008/0150950 A1* | 6/2008 | Sorgard et al. ............ 345/522 |
| 2008/0170066 A1 | 7/2008 | Falchetto |
| 2009/0303245 A1* | 12/2009 | Soupikov et al. .......... 345/582 |

FOREIGN PATENT DOCUMENTS

| | | |
|---|---|---|
| CN | 1774727 A | 5/2006 |
| CN | 101067869 A | 11/2007 |
| EP | 1 351 195 | 10/2003 |
| EP | 2 433 014 | 6/2007 |
| GB | 2 251 770 | 7/1992 |
| GB | 2 281 682 | 3/1995 |
| GB | 2 298 111 | 8/1996 |
| GB | 2 343 603 | 5/2000 |
| GB | 2 378 108 | 1/2003 |
| GB | 2 444 628 | 6/2008 |
| GB | 2 444 863 | 6/2008 |
| JP | 2002-526842 | 8/2002 |
| JP | 2003-296747 | 10/2003 |
| JP | 2003-529859 | 10/2003 |
| JP | 2004-537129 | 12/2004 |
| JP | 2007-157155 | 6/2007 |
| JP | 2008-165760 | 7/2008 |
| WO | WO 90/06561 | 6/1990 |
| WO | WO 95/28685 | 10/1995 |
| WO | WO 97/06512 | 2/1997 |
| WO | WO 97/06512 A2 | 2/1997 |
| WO | WO 98/29838 | 7/1998 |
| WO | WO 00/28483 | 5/2000 |
| WO | WO 00/11605 | 8/2000 |
| WO | WO 01/75803 | 10/2001 |
| WO | WO0175803 A1 | 10/2001 |
| WO | WO 01/95257 | 12/2001 |
| WO | WO 03/010717 | 2/2003 |
| WO | WO 2004/066059 A2 | 8/2004 |
| WO | WO 2004/093012 | 10/2004 |
| WO | WO2004093012 A2 | 10/2004 |
| WO | WO 2005/020582 | 3/2005 |
| WO | WO 2005/116930 | 12/2005 |

OTHER PUBLICATIONS

English translation of Third Office Action issued May 14, 2012 in Chinese application No. 200610130945.0.

Office Action mailed May 24, 2011 in co-pending U.S. Appl. No. 11/633,647.

United Kingdom Intellectual Property Office Search Report and Examination Report mailed Apr. 16, 2009 in corresponding Great Britain Application No. GB0900700.6.

United Kingdom Intellectual Property Office Search Report and Examination Report mailed May 11, 2010 in corresponding Great Britain Application No. GB1000710.2.

Maurice Ribble, gdc2008, Next-Gen Tile-Based GPUs, Feb. 18-22, 2008; San Francisco.

Jason Cross Publication, Intel Lifts the Larrabee Veil a Little, Tile Rendering is Back—CPUs, Boards & Components by Extreme Tech. mht. Aug. 4, 2008.

Crisu et al., 3D Graphics Tile-Based Systolic Scan-Conversion, downloaded Feb. 2010, pp. 517-521.

Crisu et al., Efficient Hardware for Antialiasing Coverage Mask Generation, Jun. 2004, pp. 1-8, (Proceedings of the Computer Graphics International).

Crisu et al., Efficient Hardware for Tile-Based Rasterization, Nov. 2004.

Greene et al., Hierarchical Polygon Tiling with Coverage Masks, Jun. 20, 1995.

Zone Rendering—Whitepaper, Document No. 298587-001, May 2002, pp. 1-15.

Kim Jeong Hyun, Hardware-Driven Visibility Culling paper, Document No. 20073114, pp. 1-7, 2007, (http://jupiter.kaist.ac.kr/~sungeui/SGA07/).

Office action mailed Jan. 26, 2010 in co-pending U.S. Appl. No. 11/633,647.

Office action mailed May 19, 2009 in co-pending U.S. Appl. No. 11/633,647.

Office Action mailed Jul. 22, 2010 in co-pending U.S. Appl. No. 11/633,647.

Office Action mailed Nov. 18, 2011 in co-pending U.S. Appl. No. 11/987,265.

M. Olano et al "Triangle Scan Conversion using 2D Homogeneous Coordinates" Proceedings of the ACM SIGGRAPH/Eurographics Workshop on Graphics, 1997, pp. 89-95.

M. Cox et al, "Architectural Implications of Hardware-Accelerated Bucket Rendering on the PC" Proceedings of the ACM SIGGRAPH/ Eurographics Workshop on Graphics, 1997, pp. 25-34.

J. Pineda, "A Parallel Algorithm for Polygon Rasterization" Computer Graphics, vol. 22, No. 4, Aug. 1988, pp. 17-20.

J. Foley et al, Computer Graphics, Second edition, 1990, pp. 668-672.

English translation of "First Office Action," dated May 2, 2013, in corresponding Chinese application No. 201010002994.2 (14 pages).

"Proceedings. 2004 International Symposium on System-on-Chip, 2004" Antochi, I. et al Efficient tile-aware bounding-box overlap test for tile-based rendering dated Nov. 18, 2004. (8 pages).

U.S. Office Action mailed Aug. 7, 2013 in U.S. Appl. No. 11/987,265.

English Translation of Japanese Office Action (Notice of Reasons for Rejection) mailed Mar. 26, 2013 in Japanese Application No. 2007-314022.

English Translation of Chinese Office Action issued Dec. 12, 2012 in Chinese Application No. 200610130945.0.

Japanese Office Action and English Translation of Japanese Office Action mailed Oct. 22, 2013 in Japanese Application No. 2010-005906.

English Translation of Chinese Office Action mailed Jan, 8, 2014 in corresponding Chinese Application No. 2010100029942.

* cited by examiner

Type = primitive type
(e.g. triangle, line, point)

METHODS OF AND APPARATUS FOR PROCESSING GRAPHICS

This application claims priority to UK Application No. 0900700.6, filed 15 Jan. 2009, the entire contents of which is incorporated herein by reference.

The present invention relates to computer graphics processing systems and in particular to tile-based graphics processing systems.

The present invention will be described with particular reference to the processing of three dimensional graphics, although as will be appreciated by those skilled in the art, it is equally applicable to the processing of two-dimensional graphics as well.

As is known in the art, 3D graphics processing is normally carried out by first dividing a scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data (such as position, colour, texture co-ordinate and other attributes data) representing the vertex. This data is then used, e.g., when rasterising and rendering the vertex (the primitive(s) to which the vertex relates) for display.

Once primitives for a scene and their vertices have been generated and defined, they can be processed by the graphics processing system, in order, e.g., to display the scene on an output display device such as a screen or printer.

This process basically involves determining which sampling points of an array of sampling points covering the scene as it will be displayed are covered by a primitive, and then determining the appearance each sampling point should have (e.g. in terms of its colour, etc.) to represent the primitive at that sampling point. These processes are commonly referred to as rasterising and shading, respectively.

The rasterising process determines the sample positions that should be used for a primitive (i.e. the (x, y) positions of the sample points to be used to represent the primitive in the scene as it will be displayed). This is typically done using the positions of the vertices of a primitive.

The shading process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and shading. However, herein "rasterisation" will be used to refer to converting primitive data to sampling point addresses only.)

These processes are typically carried out by "representing" the sampling points as discrete graphical entities usually referred to as "fragments" on which the graphics processing operations (such as shading) are carried out. Each sampling point will, in effect, be represented by a fragment that will be used to shade the primitive at the sampling point in question. A fragment may represent (have associated with it) a single sampling point or plural sampling points. The "fragments" are the graphical entities that pass through the shading process (the shading pipeline).

(A "fragment" is therefore effectively (has associated with it) a set of primitive data as interpolated to a given screen space sample point or points of a primitive. It may also include per-primitive and other state data that is required to shade the primitive at the sample point or points (fragment position) in question. Each graphics fragment can reasonably be thought of as being effectively equivalent to a "pixel" of the scene as it is processed).

Each graphics "fragment" may correspond to a single pixel (picture element) in the final output display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

The output of the rasterising and shading processes is a two-dimensional array of suitably shaded sampling points that can then, as is known in the art, be applied to a display screen or via a printer to display the scene that has been processed (subject to any post-processing, such as downsampling, of the image prior to display). The output two-dimensional array of sampling points that is the result of the rasterising and shading process can be thought of as being a "render target", as it is the array of positions that rendering process (the rasterisation and shading processes) produces as its output. In effect, the rasterising and shading processes "colour in" a two-dimensional render target that corresponds to the desired output image area.

many graphics processing systems use so-called "tile-based" rendering. In tile-based rendering, the two-dimensional output array of the rendering process that will be used to display the scene (the "render target") is sub-divided or partitioned into a plurality of smaller sub-regions, usually referred to as "tiles", for the rendering process. The tiles (sub-regions) are each rendered separately (typically one-after-another). The rendered tiles (sub-regions) are then recombined to provide the complete output array (render target) e.g. for display.

The tiles can therefore be thought of as the sub-divisions of the render target area that the rendering process operates on. In such arrangements, the render target area (output area) is typically divided into regularly-sized and shaped tiles (they are usually e.g., squares or rectangles) but this is not essential.

Other terms that are commonly used for "tiling" and "tile-based" rendering include "chunking" (the sub-regions are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that it can, inter alia, reduce the amount of main memory (e.g. off-chip DDR-SDRAM) graphics bandwidth, and save power. This is because tile-based rendering can facilitate avoiding processing primitives for regions of the render target area (the output area) where the primitives will not appear. Tile-based rendering also increases spatial locality increasing the efficiency of on-chip buffers and caches.

In a tile-based rendering system, it is accordingly usually desirable to be able to identify and know those primitives that are actually present in a given tile, so as to, e.g., avoid unnecessarily rendering primitives that are not actually present in a tile. In order to facilitate this, it is known to prepare for each tile a list of the primitives to be rendered for that tile (e.g. that will appear in the tile). Such a "primitive-list" (which can also be referred to as a "tile list") identifies (e.g. by reference to a primitive indicator) the primitives to be processed when the tile in question is rendered for display.

The process of preparing primitive lists for each tile to be rendered basically therefore involves determining the primitives that should be rendered for a given tile. This process is usually carried out by determining (at a desired level of accuracy) the primitives that intersect (i.e. that will appear (at least in part) within) the tile in question, and then preparing a list of those primitives for future use by the graphics processing system.

(It should be noted here that where a primitive falls into more than one tile (as will frequently be the case), it is included in the tile list for each tile that it falls within. Also, due to limited accuracy in the tiling process, some primitives may be listed in the primitive lists for tiles that they do not actually reside in.)

In effect, each tile can be considered to have a bin (the primitive-list) into which any primitive that is found potentially to fall within (i.e. intersect) the tile is placed. Indeed, the process of sorting the primitives on a tile-by-tile basis in this manner is commonly referred to as "binning" and the lists of primitives so-prepared are commonly referred to as "bins".

For convenience, the term "bin" will be used herein to refer to a list of primitives prepared for the purposes of indicating the primitives to be processed for a tile (or a set of tiles). (In essence, as discussed above, the "tiles" are the render target (output) area sub-regions (sub-divisions) that the rendering process operates on, and the "bins" (primitive lists) are the render target (output) area sub-regions (sub-divisions) that the graphics "jobs" (e.g. primitives) are distributed into to assist the rendering process (the "bins" effectively record the distribution of the graphics "jobs" across the area of the output render target). Each "bin" may correspond to a single tile, but, as will be discussed further below, it is also known and possible for a bin to correspond to plural tiles.)

As known in the art, the process of determining the primitives that should be listed (rendered) for any given tile can be carried out at varying levels of precision, for example depending on efficiency optimisations for different parts of the binning and rendering processes. For example, at the most precise level, it could be determined exactly which tiles a given primitive will appear at least in part in, and the primitive then included in the bins (primitive lists) for those tiles only. This is commonly referred to as "exact" binning.

FIG. 1 illustrates the exact binning process. As shown in FIG. 1, the output form of a scene 1 to be displayed (the render target area) is divided into sixteen regularly sized rendering sub-regions or tiles 2. It is then determined for each primitive in the scene, which tile or tiles the primitive actually appears (falls) within. The primitive is added to the bin (primitive-list) for each tile that it is found to fall within. Thus, taking the example shown in FIG. 1, the primitive 3 is added to the "bin" (primitive-list) for tile 4, the primitive 5 is included in the bins for tiles 6 and 7, the primitive 8 is included in the bin (primitive list) for tiles 9, 10, 11 and 12, and the primitive 13 is included in the bin (primitive-list) for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare "bins" (primitive-lists) with a lower precision than is achieved with exact binning. This can be useful to, e.g., simplify the preparation of the primitive-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the primitive-lists.

Once lists of primitives to be rendered (bins) have been prepared for each tile in this way, the primitive-lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene as it will be output where they are not present.

One consequence of using a tile-based rendering arrangement is the need, as discussed above, to maintain for each tile a list of the primitives that must be processed for the tile. There is an overhead and cost for each such primitive list that must be maintained.

Moreover as the graphics systems' frame buffer sizes increase, this requirement can become increasingly onerous. For example, for a 1080P (HDTV) display format, more than 8000 tiles may be needed (assuming 16×16 sample position tiles). The size of all the primitive lists for this many tiles is large. Each new full screen primitive will add up to 8000 commands (depending upon how many tiles the primitive must be listed for). There is also a significant overhead to maintain the pointers to each of the primitive lists. All of this can seriously affect performance.

One way to reduce these costs would be to maintain fewer primitive lists (bins). It has therefore been proposed to, for example, maintain primitive lists (bins) that cover more than one tile (a bigger render target (output) area than just one tile), such as a 2×2 or 4×4 group of tiles, rather than an individual tile, so as to reduce the number of primitive lists (bins) that are needed for a given number of tiles.

This reduces the number of bins (primitive lists) that are used, and thus the costs associated with maintaining the bins (primitive lists), such as the memory requirements and pointer maintenance for the primitive lists (bins).

However, the Applicants have recognised that a drawback with this arrangement is that data for each primitive listed in a bin (primitive list) will need to be read for each tile that the bin (primitive list) covers, even if the primitive in fact does not reside in all of the tiles that the bin covers. (This is because even if the primitive can be rejected early in the rendering process as not falling within the tile being processed, it is still necessary to read out the primitive data for the primitive in question to be able to determine whether the primitive actually falls within the tile in question or not.) For example, for a bin that covers N tiles, the data for each primitive in the bin will be read out N times, even if a primitive may only be located in a few of the tiles that the bin covers.

Thus although using primitive lists (bins) that represent a bigger render target (output) area can reduce the costs associated with maintaining the primitive lists (bins), that is at the expense of potentially incurring a greater number of memory accesses when processing the tiles for display.

This is undesirable, as the scene description (including the primitive lists (bins) and primitive data) will typically be stored in main memory and need to be fetched from there by the graphics processor when required.

The Applicants believe therefore that there remains scope for improvements in tile-based computer graphics rendering systems.

According to a first aspect of the present invention, there is provided a method of generating a set of data for use when rendering a scene for display in a tile-based graphics processing system, the method comprising:

determining and storing a list of primitives to be rendered for a set of plural tiles; and determining and storing information for indicating the distribution of the primitives in the list of primitives within the render target area encompassed by the set of plural tiles that the list is being prepared for.

According to a second aspect of the present invention, there is provided an apparatus for generating a set of data for use when rendering a scene for display in a tile-based graphics processing system, the apparatus comprising:

means for determining and storing a list of primitives to be rendered for a set of plural tiles; and means for determining and storing information for indicating the distribution of the primitives in the list of primitives within the render target area encompassed by the set of plural tiles that the list is being prepared for.

The present invention relates to tile-based graphics processing systems and involves the preparation of a primitive list (bin) for a set of plural tiles (i.e. for a render target (output) region that is bigger than a single tile). This is similar to the arrangements discussed above where primitive lists for sets of plural tiles are prepared.

However, in the present invention, as well as preparing a primitive list for the set of plural tiles, information for indicating the distribution of the primitives in the primitive list within the render target area (output area) that the primitive list encompasses (the set of tiles that the primitive list corresponds to) is prepared and stored.

This primitive distribution information will then allow the graphics processing system, when it comes to render the tiles that the primitive list corresponds to, to determine information about the distribution of the primitives in the list in the area that the list covers and thus, e.g., and preferably, and as will be discussed further below, to determine the particular sub-regions (e.g. tiles) of the area that the primitive list covers that each primitive should actually be processed for.

This would then allow, e.g., the rendering process to avoid processing a primitive in the primitive list that the primitive distribution information indicates is not actually present in (required to be processed for) a given tile or tiles that the primitive list encompasses. (This is in contrast to the prior art systems, where, as discussed above, each primitive in the primitive list is processed for each tile that the primitive list encompasses, even if the primitive may not fall within all the tiles that the primitive list encompasses.)

In effect, the present invention provides additional distribution information that allows a better determination of which tiles each primitive in the list should be processed for. This information can then be used to skip a primitive in the rendering process for a tile if the primitive isn't actually needed for the tile in question.

As the present invention allows the graphics processing system to more readily miss out or skip primitives in the primitive list when rendering the tiles for display, it can reduce the number of memory accesses, etc., that may be performed when rendering a scene for display even where a given primitive list prepared for the scene may encompass several tiles of the scene. Thus, the present invention facilitates the use of primitive lists (bins) that encompass several tiles of a scene to be processed, but, inter alia, will reduce the number of memory accesses, etc., e.g. to read the scene description, when doing that (as compared to existing prior art systems).

Reducing the number of memory accesses required will reduce the power consumed by the graphics processor and memory sub-system in use. It also reduces the memory bandwidth requirements, which facilitates, for example, using a lower performance, lower power memory system. All of this is advantageous in the context of graphics processors, for example, and in particular, in the context of and for use with embedded and/or lower cost, lower power graphics processors, such as may be used in portable and mobile devices.

Furthermore, the additional features and functionality of the present invention can be achieved with only relatively minor hardware and/or software additions, such as a small amount of additional logic for handling the additional information that the present invention stores and uses. This again makes the present invention particularly suitable for use in lower cost, lower powered, e.g. embedded, graphics processing systems.

The present invention also extends to the use of the data structures of the present invention when rendering a scene for display and to a method or apparatus of rendering a tile or scene for display in a graphics processing system.

Thus, in a preferred embodiment, the method and apparatus of the present invention comprise steps of or means for:

determining and storing a list of primitives to be rendered for a set of plural tiles of a scene to be displayed;

determining and storing information for indicating the distribution of the primitives in the list of primitives within the render target area encompassed by the set of plural tiles that the list is being prepared for;

using the determined primitive list to determine a set of primitives to be processed for a tile that the primitive list encompasses;

using the determined primitive distribution information associated with the primitive list to determine the primitives of the set of primitives in the primitive list to be processed for the tile in question; and processing the determined primitives to render the tile for display.

Similarly, according to a third aspect of the present invention, there is provided a method of rendering a scene for display in a tile-based graphics processing system in which lists of primitives to be rendered for sets of plural tiles are prepared, together with information indicating the distribution of the primitives in such a list of primitives within the render target area encompassed by the set of plural tiles that the list corresponds to, the method comprising the graphics processing system, when it is processing a tile for a scene to be displayed:

using a primitive list for the scene that encompasses the tile in question to determine a set of primitives to be processed for the tile in question;

using the primitive distribution information associated with the primitive list to determine the primitives of the set of primitives in the primitive list to be processed for the tile in question; and processing the determined primitives to render the tile for display.

According to a fourth aspect of the present invention, there is provided a tile-based graphics processor in which lists of primitives to be rendered for sets of plural tiles are prepared, together with information indicating the distribution of the primitives in such a list of primitives within the render target area encompassed by the set of plural tiles that the list corresponds to, the graphics processor comprising:

means for using a primitive list for a scene to be displayed to determine a set of primitives to be processed for a tile for the scene;

means for using the primitive distribution information associated with the primitive list to determine the primitives of the set of primitives in the primitive list to be processed for the tile in question; and means for processing the determined primitives to render the tile for display.

The present invention also extends to the data structures that are prepared and used in the present invention.

Thus, according to a fifth aspect of the present invention, there is provided a data structure for use in a tile-based graphics processing system, comprising:

a list of primitives to be rendered for a set of plural tiles; and information for indicating the distribution of the primitives in the list of primitives within the render target area encompassed by the set of plural tiles that the list of primitives corresponds to.

The tiles that the render target (the output form of the scene to be rendered) is divided into for rendering purposes in the present invention can be any desired and suitable size and shape. The tiles are preferably all the same size and shape, as is known in the art, although this is not essential. In a preferred arrangement, each tile is 16×16 or 32×32 sampling positions (e.g. fragments) in size.

The set of plural tiles that the primitive list (bin) is prepared for can be any suitable and desired set of plural tiles. It preferably covers a regular-shaped area of the render target area, such as a square or rectangle, and preferably encompasses a contiguous set of tiles. In a preferred embodiment, the set of plural tiles corresponds to a 2×2, or a 4×4, or a 16×16, grouping of tiles. Most preferably, the entire render target area is divided into matching sets of tiles (e.g. 2×2 or 4×4 sets of tiles) and a primitive list (bin) is prepared for each such set of tiles.

The sorting of the primitives into the bins (primitive lists), and the preparation of the primitive lists, can be carried out in any appropriate and desired manner. For example, any technique already known and used for sorting and binning primitives into primitive lists, such as exact binning, or bounding box binning, or anything in between, can be used for this process. Preferably a bounding box binning process is used.

The individual bins (primitive lists) and the primitives, etc., in them can be arranged in any desired and suitable fashion and include any desired and suitable data. The lists are preferably arranged and contain data in a similar manner as is already used for such graphics primitive lists (bins), etc., in the art.

Preferably a set of primitive information is listed for each primitive in the bin. The primitive information that is listed in the bin (primitive list) for each primitive can be any suitable and desired such information. Thus it can and preferably does include one or more of a primitive type indicator, pointers or indexes to vertex data for the primitive, and rendering state information for the primitive (where, e.g., a system such as that described in the Applicant's UK Patent No. 2420261 is being used).

The primitive distribution information that is also determined and stored in the present invention can be any suitable and desired such information, i.e. that will allow the graphics system to identify more precisely (at a higher resolution than simply the entire area encompassed by the set of plural tiles that the primitive list corresponds to) which tiles of the set of plural tiles a given primitive or primitives should be processed for. In essence, the primitive distribution information should indicate for a primitive or primitives, and preferably for each primitive, in the bin (list) more precisely where the primitive or primitives lie within the entire bin area.

In a particularly preferred embodiment, the distribution information indicates where a primitive or primitive lies within a sub-division of the bin area and most preferably which sub-region or sub-regions of a set of sub-regions of the render target area that the bin (primitive list) encompasses, a primitive or primitives, and preferably each primitive, in the list (bin) should be processed for.

In one particularly preferred embodiment, the sub-regions that the distribution information relates to each correspond to an individual tile, such that, in effect, the distribution information indicates directly which tile or tiles of the plural tiles that the list of primitives encompasses, the or each primitive should be processed for when the scene is rendered.

However, it would also be possible for the sub-regions that the distribution information relates to to themselves correspond to plural tiles. For example, a primitive list that covers a 4×4 group of tiles could be sub-divided into four 2×2 tile sub-regions (each representing a quarter of list area), or, indeed, four 1×4 tile sub-regions (each represent a row or column of the list area) and the distribution information could indicate which of these sub-regions (e.g. quarter or row, etc.) each primitive should be processed for. In this case, the distribution information will need to indicate one of four sub-regions, rather than, e.g., one of 16 tiles, for a primitive, which will, of course, require less data to indicate.

These arrangements will still be advantageous, as they will still allow the system to avoid simply having to process all the primitives in the list for the entire area covered by the list. It may be desirable to use sub-regions within a primitive list area that are bigger than a tile where, for example, providing distribution information at the resolution of individual tiles would require more data capacity than is desired or available.

(Where the primitive distribution information indicates sub-regions within the primitive list area that comprise more than one tile, then, as will be appreciated by those skilled in the art, that will still indicate indirectly the tile or tiles each primitive in the list should be processed for, albeit at a resolution lower than the level of a single tile.)

The distribution of a primitive within the area that the primitive list (bin) corresponds to can be determined in any suitable and desired fashion, for example using any known and desired binning technique. For example, an exact binning technique could be used. In a particularly preferred embodiment, a bounding box binning technique, using axis-aligned bounding boxes, is used to determine the distribution of the primitives.

(It should be noted here that this primitive distribution testing will typically be carried out anyway to carry out the overall binning process and, moreover, will usually be carried out at the level of resolution of individual tiles, even if the bins (primitive lists) are to be prepared for sets of plural tiles. Thus the more precise distribution information that the present invention also prepares and stores can in fact be generated as part of the "normal" binning process that must be carried out anyway, and so operation in the manner of the present invention should not significantly increase the processing that is required in this regard, nor require significant modification to the known and existing graphics binning processes and hardware.)

It should also be noted here that where, e.g., a bounding box binning technique is used, the primitive distribution information may not precisely indicate the tiles, etc., that the primitive itself falls within, but rather will, in effect, indicate the distribution of the "bounding box" within the bin area. However, this will still have the effect of indicating the primitive's distribution within the bin area, and at a higher resolution than just for the bin as a whole, and so still acts as primitive distribution information in the manner of the present invention.

The primitive distribution information can take any suitable and desired form that can indicate the required information. In a preferred embodiment it is in the form of a coverage mask, preferably in the form of a bitmap. (A bitmap is a particularly convenient way of representing such coverage information.)

Thus preferably a coverage mask (e.g. bitmap), with each position in the mask (e.g. map) corresponding to a given sub-region (e.g. tile) within the primitive list area, is used to indicate the distribution of a primitive in the area that the primitive list corresponds to.

The distribution information (e.g. coverage bitmaps) may be stored in an uncompressed format, but in a preferred embodiment the distribution information is stored in a compressed form. Any conservative compression scheme that can represent higher resolution distribution information (e.g. bitmap) using fewer bits can, for example, be used for this purpose. Thus, for example, a lossless compressed format (e.g. using run-length encoding), or a lossy, but conservative, compressed format can be used.

Thus, in a preferred embodiment, an encoding scheme is used to represent the distribution information (e.g. coverage bitmaps) using fewer bits of storage.

The Applicants have recognised in this regard that certain distribution possibilities within the set of tiles that a primitive list corresponds to may in fact be unlikely or impossible ever to occur.

For example, in practice primitives will tend to cover contiguous tiles within a given row of tiles. Thus, if one considers a row of four tiles, for example, with a bit map of xxxx for representing the distribution of a given primitive in that row, the distribution possibilities in the row for a given primitive will in practice be 0001, 0010, 0100, 1000, 0011, 0110, 1100, 0111, 1110, 1111 (where "1" indicates the primitive is present in (should be processed for) the tile corresponding to that position) and it should not be necessary to be able to indicate, e.g., a distribution of 0101, 1010, 1001, etc.

The effect of this is that the Applicants have recognised that a given coverage bitmap arrangement does not therefore have to be able to indicate all possible distribution possibilities but some distribution possibilities can be omitted. Thus, the distribution information can be compressed by not providing the ability to indicate all distribution possibilities in the primitive list area.

Thus, in a particularly preferred embodiment, the distribution information (e.g. tile coverage bitmaps) is compressed by allowing that information to represent only some, but not all, of the complete set of distribution possibilities within the area covered by the set of plural tiles that the primitive list corresponds to.

Similarly, the distribution information need not represent the coverage bitmap (e.g.) directly but can be encoded as a value that then indicates the bitmap in question (e.g. via a look-up table). For example, where, as discussed above, for a row of four tiles it is desired to indicate bitmaps of 0001, 0010, 0100, 1000, 0011, 0110, 1100, 0111, 1110, and 1111, then instead of using four bits to do that, a 3-bit encoding scheme could be used, for example as follows:

0→0001
1→0010
2→0100
3→1000
4→0011
5→0110
6→1100
7→1111 (and 0111, 1110)

In this case, 0111, and 1110, are conservatively compressed by mapping them to 1111, i.e. 0111, 1110 are encoded as "7", and when "7" is read, it will be interpreted as "1111". There is no need to encode 0000, as primitives that aren't in the bin area at all will not be listed.

Thus, in a preferred embodiment, the distribution information is provided in an encoded form from which a distribution bitmap can be derived or identified. Similarly, the encoded form is preferably configured such that the encoded form of the distribution information can only represent some, but not all, of the complete set of distribution possibilities within the area covered by the set of plural tiles that the primitive list corresponds to.

It would also be possible to use separate sets of distribution information for, e.g., each axis (direction), e.g., for the X and Y directions, and then to combine that information to derive the overall distribution information for a given primitive.

For example, in the above case of using a 3-bit encoding scheme to represent coverage along a row of four tiles, for a 4×4 set of tiles, such a scheme could be used for each of the X and Y directions, with the X and Y coverage values for a given tile being looked up separately and then combined to determine if the primitive actually falls in the tile in question (in practice, if the lookup of the bitmaps for a tile returns a "1" for both X and Y, the primitive should be processed for the tile in question (but not otherwise)). This arrangement would then allow the distribution information for a 4×4 set of tiles to be represented using just two 3-bit coverage value encoding schemes (i.e. 6-bits in total), instead of, e.g., having to use a full 16-bit bitmap (which would be necessary if a bitmap representing the 4×4 set of tiles directly (without any intermediate encoding) was to be used).

Thus, in a preferred embodiment, the distribution information is encoded separately for each of two directions (preferably the X and Y directions), and then appropriately combined when it is to be used to determine the distribution of a primitive within the area covered by the primitive list.

In these arrangements where some form of compression and/or encoding of the distribution information is used, then if necessary appropriately conservative testing of the distribution of the primitives in the area that the primitive list corresponds to can be used to ensure that the distribution of each primitive can be represented so as to allow the primitive to be rendered correctly using the encoding scheme in question.

Equally, where there is a constraint on the technique to be used for the distribution testing, then an appropriate conservative compression scheme can be used to ensure that the primitives' distribution can be suitably represented.

The primitive distribution information can be stored as desired. It preferably indicates for each primitive in the primitive list, the distribution of the primitive within the area (set of tiles) that that primitive list relates to, most preferably so that the tile or tiles, or sub-set or sub-sets of tiles, of the plural tiles that the primitive list is for, that the primitive should be processed for can be determined.

In a particularly preferred embodiment, each primitive in the primitive list (bin) has a set of associated distribution information, such as, and preferably, an associated coverage bitmap. Thus, for each primitive in the primitive list (bin), there is preferably a set of associated distribution information indicating the distribution of that primitive across the area that the primitive list (bin) corresponds to.

This associated distribution information may, e.g., be included as part of the primitive information (e.g. vertex indices, etc.) that is stored in the bin for each primitive.

In a preferred embodiment, the primitive distribution information can be read separately to the remaining primitive information. This would then allow the distribution information to be checked first, so that, e.g., the reading of the rest of the primitive information in the bin (primitive list), such as the vertex indices, can then be avoided if the primitive is not required for the tile in question. This can further reduce the memory accesses and bandwidth required. This can be achieved, e.g., by storing the primitive distribution information in a separate data structure or as a header, etc., that can be read separately to the other primitive information in the primitive list.

It may also be preferred to store the primitive distribution information separately to the other primitive information so as to facilitate backwards compatibility of the techniques of the present invention with existing graphics processing systems.

Although the present invention requires the use of primitive lists (bins) that encompass more than one tile, in a preferred embodiment, primitive lists (bins) for individual tiles can also be and are also prepared and used. In this case, there may then be primitive lists specific to individual tiles and primitive lists for sets of plural tiles. Thus, in a preferred embodiment, primitive lists can be prepared for individual tiles and for sets of plural tiles.

In one preferred such embodiment, the arrangement is such that primitive lists may be prepared for sets of plural tiles having different numbers of tiles, and for individual tiles, for example in a "hierarchical" fashion as described in the Applicant's UK Patent No. 2433014.

In these cases, the distribution information of the present invention can be (and preferably is) prepared and stored for (each of) the primitive lists that correspond to sets of plural tiles, but would not be needed for the primitive lists that correspond to a single tile.

Indeed, it is an advantage of the present invention that it can be used in and to improve both lower performance tiling graphics processors that simply use bigger "bins", and higher performance graphics processors that use, e.g., more complex binning arrangements, such as hierarchical binning arrangements.

It will be appreciated that the primitives that are listed in the primitive lists may be and typically will be simple primitives, such as simple polygons, such as triangles, quads, lines or points. However, the present invention is equally applicable where other forms of graphics descriptors that may not be simple primitives may be included in the primitive lists.

Such other graphics descriptors could, e.g., comprise procedural descriptions, such as procedural draw calls, higher order or higher level descriptions of, e.g., objects to be rendered (such as a smooth surface representation of an object), representations of sets of plural primitives (such as a draw call), etc. The present invention extends to the inclusion of any such descriptor in the primitive lists (and the association, where appropriate, of distribution information with such a descriptor).

The present invention is similarly applicable where, e.g., graphics commands may be distributed across primitive lists (e.g. because they are screen-position dependent). Thus, the primitive lists may also comprise graphics commands with associated distribution information, or there may, e.g., be a separate set of "command" lists (bins) to which the graphics commands are distributed.

In general, the present invention may be used (if desired) for any form of graphics data or processing that may be position dependent, although it will be of greatest interest in relation to primitives, as they form the bulk of position-dependent data in graphics systems.

A suitable primitive list (bin) together with associated distribution information should be prepared for each set of tiles making up the scene as to will be displayed (the render target).

Once the primitive lists and associated distribution information have been prepared for the sets of tiles, then this information can be used when rendering the tiles making up the scene to be displayed, by, as discussed above, using the primitive lists and associated distribution information to determine which primitives, etc., need to be processed (rendered) for each tile.

In other words, the rendering process will preferably use the associated distribution information for the primitives in the primitive lists to determine whether the (each) primitive actually needs to be processed for the tile in question (and if it does not, will skip the primitive and move on to the next primitive in the list, and so on).

This rendering process may be and preferably is carried out in a similar manner to known tile-based rendering systems. Thus, preferably, each tile is processed and rendered separately. This rendering can be carried out in any desired manner, for example, by rendering the individual tiles in succession or in a parallel fashion. Once all the tiles have been rendered, they can then be recombined, e.g., in a frame buffer, for display, as is known in the art.

In a preferred embodiment, the graphics processing system can process the output frame to be displayed as plural separate sub-frames, such that, in effect, the overall output frame that will be displayed may be divided into different sub-frames, with each sub-frame then being processed as if it were a single frame (so being divided into tiles, having primitive lists prepared for it, etc.), and the plural sub-frames then being recombined to provide the overall output frame for display.

This would then provide a further possibility for sub-division of an output frame (render target) that would involve a large number of tiles. This may be desirable where, e.g., there is a limited number of bins (primitive lists) available, as, for example, rather than simply having to allow each bin to encompass more tiles (as would normally be the case to allow a finite number of bins to cover a greater number of tiles—which might then mean that the distribution information similarly has to represent a coarser resolution), instead a smaller area of the output frame (a sub-frame) could be rendered each time, thereby effectively allowing the allowed number of bins to represent a smaller area and a lower number of tiles (so that the individual bins can represent fewer tiles, and so on).

Thus, allowing the output frame to be processed as plural sub-frames offers a further option for controlling, e.g., the resolution (in terms of the frame area (number of tiles) that each primitive list, etc., corresponds to.

The various functions of the present invention can be carried out in any desired and suitable manner. In a particularly preferred embodiment they are carried out on a single graphics processing platform that generates and outputs the graphics data that is written to the frame buffer for the display device. The data structures of the present invention can be e.g., and preferably, are, generated and stored by a geometry processor, or a geometry processing unit, of the graphics processor, and then used when rendering a scene for display by a pixel (fragment) processor or processing unit (that carries out the rasterisation and rendering processes) of the graphics processor.

The functions of the present invention can be implemented in hardware or software, as desired. Thus, for example, the various "means" of the invention may comprise a suitable processor or processors, functional units, circuitry, processing logic, microprocessor arrangements, etc., that are operable to perform the various functions, etc., such as appropriately dedicated hardware elements and/or programmable hardware elements that can be programmed to operate in the desired manner.

In a preferred embodiment the system is implemented as a hardware element (e.g. ASIC). Thus, in another aspect the present invention comprises a hardware element including the apparatus of, or operated in accordance with the method of, any one or more of the aspects of the invention described herein.

It should also be noted here that, as will be appreciated by those skilled in the art, the various functions, etc., of the present invention may be duplicated and/or carried out in parallel on a given processor.

The present invention is applicable to any form or configuration of (tile-based) graphics processor and renderer, such as processors having a "pipelined" rendering arrangement (in which case the renderer will be in the form of a rendering pipeline).

As will be appreciated from the above, the present invention is particularly, although not exclusively, applicable to 3D graphics processors and processing devices, and accordingly extends to a 3D graphics processor and a 3D graphics processing platform including the apparatus of, or operated in accordance with the method of, any one or more of the aspects of the invention described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the present invention can include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data-processing system. The data processing system may be a microprocessor system, a programmable FPGA (Field Programmable Gate Array), etc.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

Figure 3:
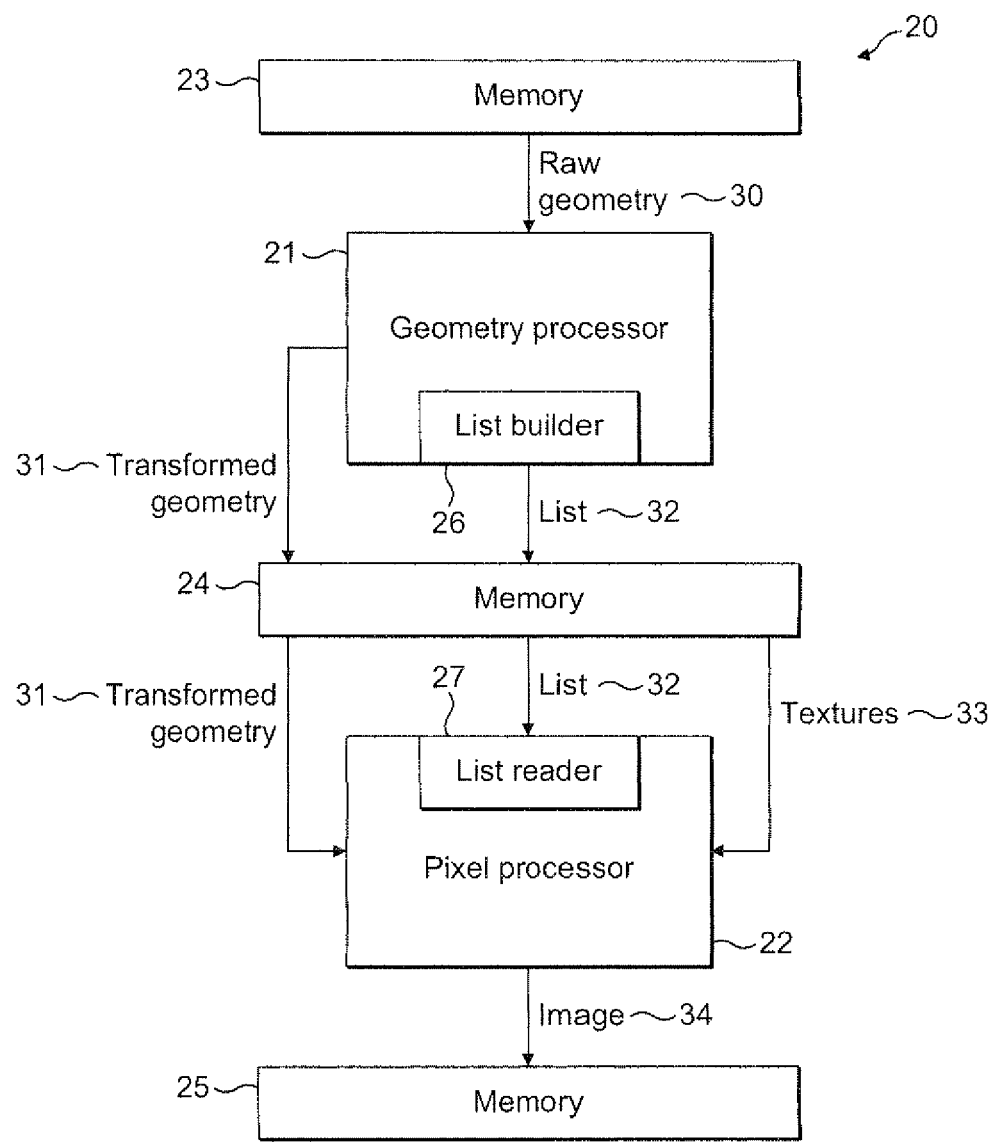
FIG. 3 shows schematically an arrangement of a graphics processor that can operate in accordance with the present invention.

FIG. 3 shows schematically a graphics processor 20 that may be operated in accordance with the present invention. The graphics processor 20 includes a geometry processor 21 and a pixel or fragment processor 22. There may be more than one pixel processor 22 operating in parallel, if desired.

The geometry processor 21 and pixel processor 22 have access to various memories 23, 24, 25 (which memories, as is known in the art, may all be part of the same physical memory, or may be separate memories, as desired). One or more of the memories may be "on-chip" with the graphics processor, or, more typically, they may be external memory (e.g. on the host processing system) that can be accessed by the geometry processor and pixel processor in use.

The geometry processor 21 also includes a list builder 26 which generates primitive lists in the manner of the present invention, and the (or each) pixel processor 22 includes a list reader 27 which reads and uses the primitive lists when rendering a scene for display. These operations will be discussed in more detail below.

The graphics processor 20 shown in FIG. 3, save for its operation is in accordance with the present invention, otherwise operates in the normal manner for such processors.

Thus, as shown in FIG. 3, in operation of the graphics processor 20, the geometry processor 21 first reads raw geometry data 30 for the scene to be rendered from the memory 23 (which raw geometry data is, for example, provided by the graphics processor driver or on API running on a host system of the graphics processor 20, as is known in the art). The geometry processor then transforms that raw geometry data 30 to give a set of transformed geometry data 31 for the scene and stores that transformed geometry data 31 in memory 24.

The list builder 26 of the geometry processor 21 also prepares at this time a set of primitive lists (bins) 32 for the scene and stores those lists in memory 24.

The memory 24 also stores a set of textures 33 for the scene. These textures may be provided as desired.

The pixel processor 22 uses the transformed geometry 31, the textures 33 and the primitive lists 32 (which are read by the list reader 27) to render the scene for display on a tile-by-tile basis, and stores the resultant output image data 34 in memory 25 (from where it can, e.g., be exported to a frame buffer for display). This is repeated for each (visible) tile of the scene.

To do this, the pixel processor 22, as is known in the art, identifies (next) tile to be processed, identifies the primitives to be processed for that tile using the primitive lists, rasterises those primitives to sampling points, generates fragments representing the sampling points, and renders the fragments by, e.g., applying textures to them, blending them, etc., to provide an output set of fragments for display.

As discussed above, as part of the processing of a scene for display, the geometry processor 21 (in practice the list builder 26 of the geometry processor 21) sorts the primitives to be rendered for the scene into sub-regions of the render target that the rendered scene will be output to and prepares a list (bin) for each such sub-region indicating the primitives that should be processed for that sub-region. In the present embodiment, each sub-region comprises plural tiles, namely a 2×2 group of tiles.

Figure 5:
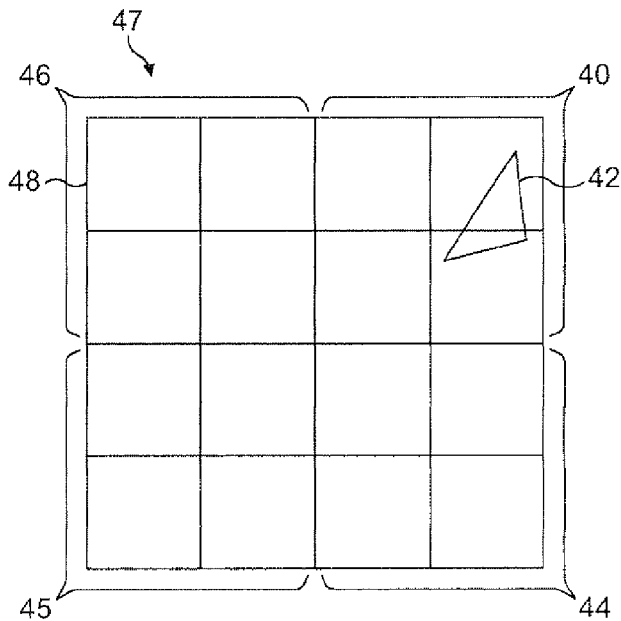
FIG. 5 shows the sub-division of a scene to be processed into tiles for rendering purposes and into sets of plural tiles for binning purposes.

FIG. 5 illustrates this and shows a render target area 47 corresponding to a scene to be rendered divided into sixteen tiles 48 (a 4×4 array of tiles) for rendering purposes. A primitive list (bin) is then prepared for each 2×2 block of tiles 40, 44, 45, 46. (FIG. 5 shows only 16 tiles for clarity purposes. As will be appreciated by those skilled in the art, in practice there may be many more tiles.) An exemplary primitive 42 is shown in FIG. 5.

To sort the primitives into the bins for each group of tiles, the list builder 26 carries out a bounding box binning process (as is known in the art), using axis-aligned bounding boxes, to determine from the transformed geometry data of each primitive for the scene which of the tiles the render target for the rendered scene is to be divided into for processing (rendering)

purposes, the primitive should be considered to fall within (i.e. will need to be processed for).

This information is then be used to allocate the primitive to (to include the primitive in) the list (bin) for each set of plural tiles that includes a tile that the primitive has been found to fall within. Thus, in the case of the primitive 42 shown in FIG. 5, that primitive is allocated to the bin for the 2×2 set of tiles 40.

Other binning techniques, such as an exact binning technique could, of course, be used for this primitive sorting and listing process, if desired.

As well as sorting the primitives into bins, and preparing primitive lists for each bin, the list builder 26, in accordance with the present invention, also determines and stores for each primitive in a bin, distribution information indicating the distribution of the primitive within the set of tiles that the bin corresponds to. In the present embodiment, this distribution information is determined for and associated with each primitive that is listed in a bin.

In the present embodiment, this primitive distribution information is determined as part of the binning process (since, as discussed above, the binning process determines the tiles that a primitive should be considered to cover), and is stored in the form of a tile coverage bitmap that indicates which of the tiles in the set of tiles that the primitive list (bin) in question corresponds to, the primitive should be processed for.

Figure 1:
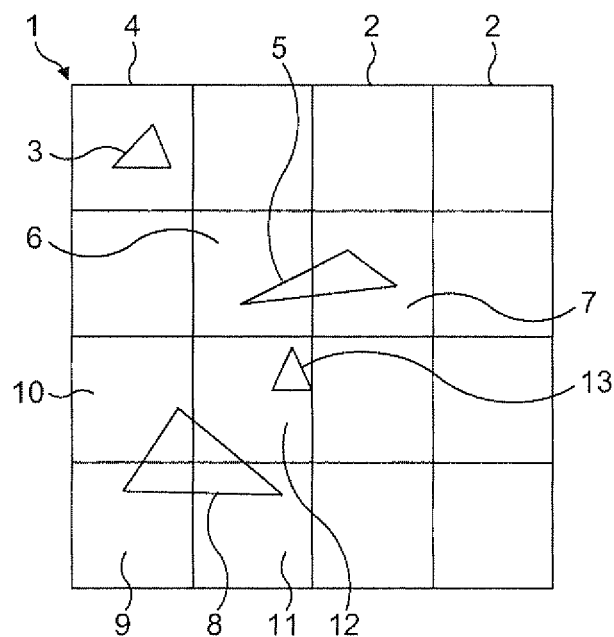
FIG. 1 shows schematically a tile-based graphics-processing arrangement.
Figure 2:
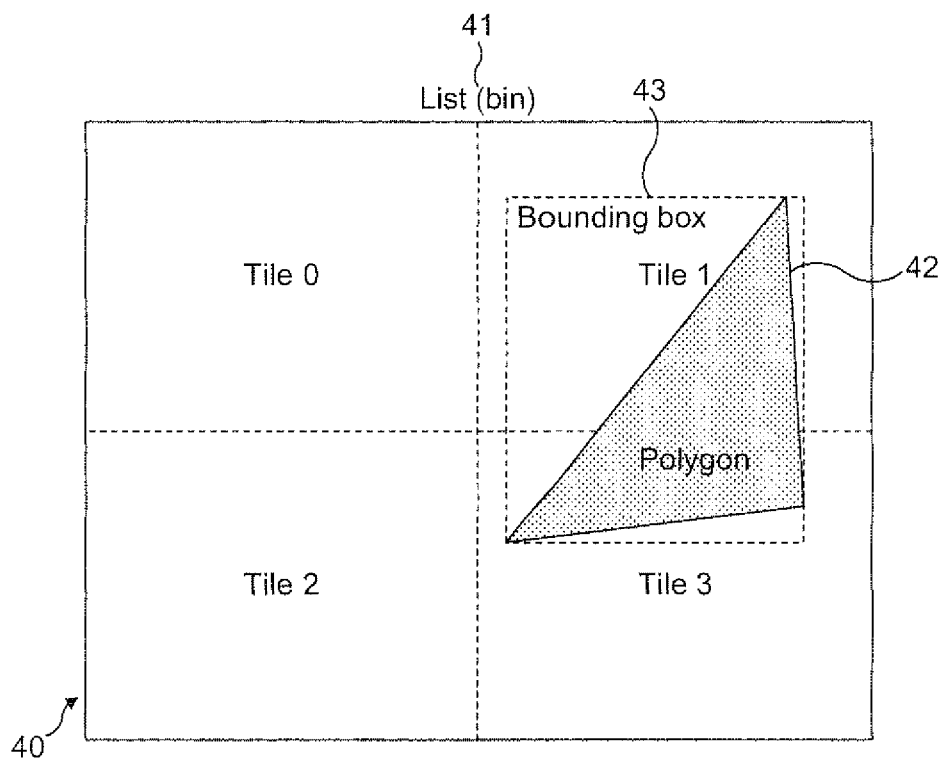
FIG. 2 shows schematically the derivation of distribution information for a primitive in accordance with the present invention.

FIG. 2 illustrates this and shows the exemplary set of 2×2 tiles 40 that a primitive list (bin) 41 is to be prepared for. In this case the primitive 42 is found by its bounding box 43 to reside in two of the four tiles that make up the set of 2×2 tiles. The primitive 42 is therefore associated with a tile coverage bitmap of the form "0101" to indicate that it lies in tiles "1" and "3" of the 2×2 group of tiles. (In this embodiment, a 4-bit bitmap xxxx, is used to indicate each primitive's distribution within the 2×2 tile block that the primitive list (bin) corresponds to.)

When it comes to processing the primitive 42 for this set of tiles 40, the pixel processor 22 (the list reader 27 of the pixel processor) will read the data for primitive 42 from the bin 41 and determine from its associated tile coverage bitmap that the primitive 42 should only be processed for tiles "1" and "3" of the set of tiles 40 (i.e. can be skipped for the tiles "0" and "2").

Figure 4:
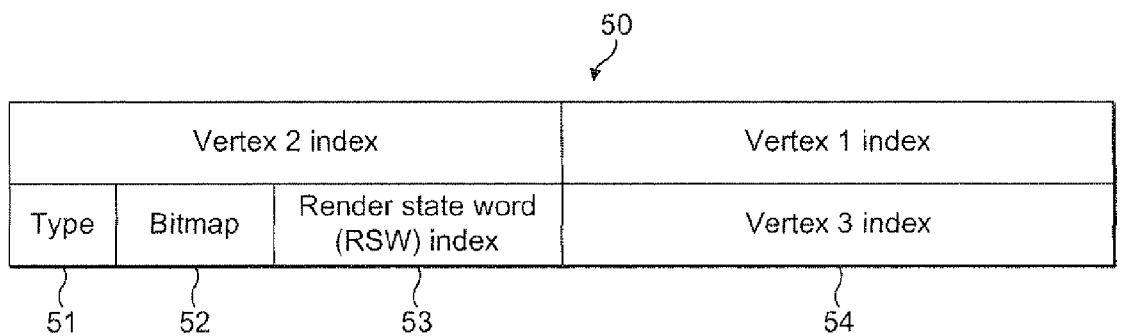
FIG. 4 shows schematically the data that is stored for a primitive in a primitive list in an embodiment of the present invention.

In the present embodiment, the distribution information (tile coverage bitmap) for each primitive is stored with the other data for the primitive in the primitive list. FIG. 4 illustrates this. Thus, as shown in FIG. 4 each primitive "entry" 50 in the primitive list stores a primitive type 51 (e.g. triangle, line, point), a tile coverage bitmap 52, a render state word index 53 for indicating the rendering state to be set when the primitive is rendered (as discussed for example in the Applicant's UK Patent No. 2420261), and indices 54 to the vertex data for the primitive. (FIG. 4 shows the memory layout for this data assuming a 32-bit wide memory. As shown in FIG. 4, if the "vertex 1" and "vertex 2" indices are 32-bits long, they will reside in the first word of memory and the other data will reside in the next word of memory).

Other arrangements would of course be possible.

When the primitive lists (bins) have been prepared, as discussed above, the pixel processor (its list reader 27) determines the primitive list (bin) that encompasses the tile it is currently processing and reads the listed information for each primitive in that primitive list (bin) in turn, as is known in the art.

However, when doing so it also reads the coverage bitmap (information) for the primitive in question to determine whether that primitive should be processed for the tile currently being processed. If the distribution information (bitmap) associated with the primitive in question indicates that the primitive does not need to be processed for the tile currently being processed, the primitive is skipped (and, e.g., its associated vertex information thus not read out), and the process moves onto the next primitive in the list and so on. This can allow the amount of data that is read as the scene is processed for display to be significantly reduced.

As will be appreciated by those skilled in the art, various changes, modifications or alternatives, etc., to the above-described arrangements can be used in the present embodiment and for the present invention if desired.

For example, instead of preparing primitive lists for 2×2 sets of tiles as discussed above, primitive lists could be prepared for 4×4 sets of tiles or 16×16 sets of tiles, etc.

The distribution information, such as the coverage bitmaps, for each primitive could be stored in a separate data structure or in a header in a list so that it can be read separately to the remaining primitive information. This would then allow the reading of the remaining primitive information in the primitive list to be skipped if it is determined that the primitive is not required to be processed for the tile in question.

It would also be possible to store the distribution information, such as the tile coverage bitmaps, in a compressed form. Any suitable conservative (lossy) compressed or lossless compressed format could be used. A non-lossy compression scheme could use, for example, run length encoding.

In one preferred embodiment of the present invention a form of bitmap compression as follows is used.

In this case, it is assumed that each primitive list represents a 4×4 set of tiles. To represent the distribution of a primitive within this set of tiles using uncompressed coverage bitmaps with a single bit in the map representing each tile in the 4×4 set of tiles would require 16 bits of storage.

However, the Applicants have recognised that the distribution information can in fact be encoded in a more compact form.

In particular, as a primitive will in practice tend only to lie in contiguous tiles within a given row or column of the 4×4 block of tiles, it is only necessary to represent a limited number of distribution possibilities along a given row or column of tiles. In particular, for any given row or column, the coverage possibilities will in practice be 0001, 0010, 0100, 1000, 0011, 0110, 1100, 0111, 1110 and 1111. These coverage bitmaps can accordingly be represented and encoded as eight different coverage values, as follows:

0→0001
1→0010
2→0100
3→1000
4→0011
5→0110
6→1100
7→1111 (and 0111, 1110 (which are conservatively mapped to 1111))

This encoding scheme can then be used to represent the coverage of a given primitive in each of the x and y directions separately using 3-bit coverage encoding values for each of the x and y directions. The current tile index modulo 4 can then be used to pick a bit out of the coverage bitmap for each of the x and y axes, and if the look-up for both axes returns "1", then the primitive needs to be processed for that tile, but not otherwise.

In this way, the coverage of primitives within the 4×4 set of tiles can be represented using only 6-bits of storage, by using a 3-bit coverage value for each of the x and y axes.

Although the above embodiments have been described with reference to indicating the distribution of primitives at the level of individual tiles within the set of plural tiles that the primitive list is prepared for, it would equally be possible to indicate the distribution of the primitive across sub-sets of plural tiles within the larger set of plural tiles that the primitive list is prepared for. For example, in the case of a primitive list for a 4×4 set of tiles as discussed above, rather than indicating directly the distribution of the primitives in the individual tiles in the 4×4 set of tiles, it would be possible, for example, to divide the set of 4×4 tiles into sub-sets of 2×2 tiles, and then indicate the distribution of each primitive across the 2×2 sub-sets of tiles.

It would also be possible to have arrangements in which primitive lists are prepared both for individual tiles and for sets of plural tiles, with, for example, the primitive distribution information being provided for those primitive lists that correspond to sets of plural tiles.

Thus, for example, a "hierarchical" binning arrangement of the form described in the Applicant's UK Patent No. 2433014 could be used if desired, with the distribution information in the manner of the present invention being provided for those primitive lists that represent sets of plural tiles.

Indeed, as well as being used in lower area and lower performance graphics processing systems, the present invention can also be applied advantageously to higher performance graphics processing systems such as systems that may use more complex binning arrangements such as hierarchical binning.

It is also, for example, not necessary to use axis-aligned bounding boxes to determine whether a primitive resides in a given tile or not, but other bounding box arrangements, for example, could be used if desired. If necessary, appropriate conservative (lossy) compression schemes could be used to ensure that tile coverage bitmaps with diagonals do not occur.

Figure 6:
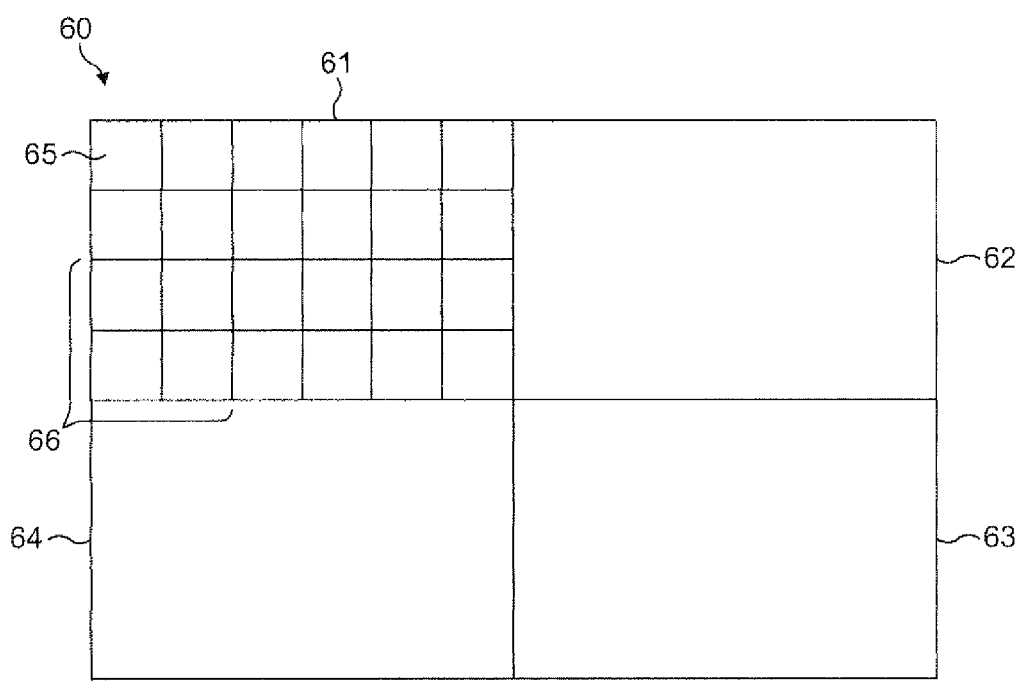
FIG. 6 illustrates the sub-division of a frame to be rendered into plural sub-frames in an embodiment of the present invention.

FIG. 6 illustrates a further preferred output frame subdivision arrangement that can be used in conjunction with the present embodiment and invention. In this case, the overall output frame 60 that the scene will be rendered to is processed as four separate sub-frames to 61, 62, 63, 64, which are then combined to provide the final output frame for display. Each individual sub-frame 61, 62, 63 and 64 is processed in the manner discussed above, i.e. subdivided into tiles 65 for rendering purposes, and has primitive lists prepared for sets of plural tiles 66 to facilitate that process. (This is shown for the sub-frame 61 only for clarity purposes.)

This arrangement offers an additional way of subdividing the output frame processing where, for example, the graphics processing system supports a fixed maximum number of bins (primitive lists) and, for example, the distribution information associated with each bin can only represent a limited number of distribution arrangements within the area covered by the primitive list (bin).

In such a system, if, for example, a frame to be drawn encompasses a large number of tiles (since, typically, the tile size will be fixed and therefore for a higher resolution display, more tiles will need to be generated), then one alternative would be simply to divide the higher number of tiles into the number of bins that is allowed. However, the effect of this would be that each bin would encompass more tiles.

Alternatively, as illustrated in FIG. 6, the overall frame 60 could be subdivided into "sub-frames", to be processed one after another. Each sub-frame would then have access to the full set of primitive lists (bins) that the graphics processing system can support, and therefore each bin would only need to encompass a smaller number of tiles as compared to if the entire output frame was being processed in one go (as a whole).

It can be seen from the above that the present invention, in its preferred embodiments at least, provides a method and apparatus for use in tiled graphics processing systems that can, in particular, reduce graphics processor (and in particular the rasterising or rendering process) memory bandwidth (in particular the number of memory accesses performed to read the scene description as a scene is processed for display). This reduces the power consumed by the graphics processor and in particular by the rasterising and rendering processes and the memory sub-system. It also allows lower performance, lower power memory systems to be used.

Moreover this can be achieved with relatively simple and minor modifications to the graphics processing system, such that, for example, only a small amount of additional logic may be required.

This makes the present invention particularly advantageous, inter alia, for lower power graphics processors such as may be used in portable and mobile devices and in embedded systems.

This is achieved in the preferred embodiments of the present invention at least by using primitive lists that cover several tiles in common. This reduces memory requirements and pointer maintenance for the primitive lists.

However, as well as doing this, the present invention also provides additional information that indicates the distribution of the primitives in the primitive list within the tiles that the primitive list covers. The rasterising and rendering process then reads this distribution information and can skip fetching primitive data, etc., if the distribution information indicates that the primitive isn't in fact needed for the tile being processed. The Applicants have found that this can reduce significantly the amount of data that is read during the rasterising and rendering process, notwithstanding the fact that primitive lists representing sets of plural tiles are being used.

The invention claimed is:

1. A method of generating a set of data for use when rendering a scene for display in a tile-based graphics processing system, the method comprising:
   determining, by one or more data processors, and storing in memory a list of primitives to be rendered for a set of plural tiles to be rendered;
   determining, by one or more data processors, and storing in memory information for indicating the distribution of the primitives in the list of primitives within an area encompassed by the set of plural tiles;
   determining, by one or more data processors, the primitives to process for a tile of the set of plural tiles using the determined and stored list of primitives and the determined and stored information indicating the distribution of the primitives in the list of primitives within the area encompassed by the set of plural tiles; and
   processing the determined primitives to render the tile for display.

2. The method of claim 1, wherein the primitive distribution information indicates directly which tiles of the set of plural tiles each primitive in the list of primitives must be processed for when the scene is rendered.

3. The method of claim 1, wherein the primitive distribution information is in the form of a coverage mask.

4. The method of claim 1, wherein the primitive distribution information is provided in an encoded form that can only represent some, but not all, of a complete set of distribution possibilities within the area covered by the set of plural tiles.

5. A method of rendering a tile of a scene for display in a tile-based graphics processing system in which lists of primitives to be rendered for sets of plural tiles to be rendered are prepared, together with information indicating the distribution of the primitives in such a list of primitives within an area encompassed by the set of plural tiles that the list corresponds to, the method comprising:
   using a primitive list for the scene to determine a set of primitives to be processed for a tile of the scene;
   using the primitive distribution information associated with the primitive list to determine the primitives of the set of primitives in the primitive list to be processed for the tile; and
   processing the determined primitives to render the tile for display.

6. The method of claim 5, wherein the primitive distribution information indicates directly which tiles of the set of plural tiles each primitive in the list of primitives must be processed for when the scene is rendered.

7. The method of claim 5, wherein the primitive distribution information is in the form of a coverage mask.

8. The method of claim 5, wherein the primitive distribution information is provided in an encoded form that can only represent some, but not all, of a complete set of distribution possibilities within the area covered by the set of plural tiles.

9. The method of claim 5, wherein the primitive distribution information can be read separately from the remaining primitive information in the primitive list.

10. An apparatus for generating a set of data for use when rendering a scene for display in a tile-based graphics processing system, the apparatus comprising:
    processing circuitry configured to determine and store a list of primitives to be rendered for a set of plural tiles to be rendered;
    processing circuitry configured to determine and store information for indicating the distribution of the primitives in the list of primitives within the area encompassed by the set of plural tiles;
    processing circuitry configured to determine the primitives to process for a tile of the set of plural tiles using the determined and stored list of primitives and the determined and stored information indicating the distribution of the primitives in the list of primitives within the area encompassed by the set of plural tiles; and
    processing circuitry configured to process the determined primitives to render the tile for display.

11. The apparatus of claim 10, wherein the primitive distribution information indicates directly which tiles of the set of plural tiles each primitive in the list of primitives must be processed for when the scene is rendered.

12. The apparatus of claim 10, wherein the primitive distribution information is in the form of a coverage mask.

13. The apparatus of claim 10, wherein the primitive distribution information is provided in an encoded form that can only represent some, but not all, of a complete set of distribution possibilities within the area covered by the set of plural tiles.

14. A tile-based graphics processor in which lists of primitives to be rendered for sets of plural tiles to be rendered are prepared, together with information indicating the distribution of the primitives in such a list of primitives within the area encompassed by the set of plural tiles that the list corresponds to, the graphics processor comprising:
    processing circuitry configured to use a primitive list for a scene to be displayed to determine a set of primitives to be processed for a tile for the scene;

processing circuitry configured to use the primitive distribution information associated with the primitive list to determine the primitives of the set of primitives in the primitive list to be processed for the tile in question; and processing circuitry configured to process the determined primitives to render the tile for display.

15. The apparatus of claim 14, wherein the primitive distribution information indicates directly which tiles of the set of plural tiles each primitive in the list of primitives must be processed for when the scene is rendered.

16. The apparatus of claim 14, wherein the primitive distribution information is in the form of a coverage mask.

17. The apparatus of claim 14, wherein the primitive distribution information is provided in an encoded form that can only represent some, but not all, of a complete set of distribution possibilities within the area covered by the set of plural tiles.

18. The processor of claim 14, wherein the primitive distribution information is separately readable from the remaining primitive information in the primitive list.

19. One or more non-transitory, computer readable storage devices having computer readable code embodied on the computer readable storage devices, the computer readable code for programming one or more data processors to perform a method of generating a set of data for use when rendering a scene for display in a tile-based graphics processing system, the method comprising:

determining and storing a list of primitives to be rendered for a set of plural tiles to be rendered;

determining and storing information for indicating the distribution of the primitives in the list of primitives within an area encompassed by the set of plural tiles;

determining the primitives to process for a tile of the set of plural tiles using the determined and stored list of primitives and the determined and stored information indicating the distribution of the primitives in the list of primitives within the area encompassed by the set of plural tiles; and processing the determined primitives to render the tile for display.

20. One or more non-transitory, computer readable storage devices having computer readable code embodied on the computer readable storage devices, the computer readable code for programming one or more data processors to perform a method of rendering a tile of a scene for display in a tile-based graphics processing system in which lists of primitives to be rendered for sets of plural tiles to be rendered are prepared, together with information indicating the distribution of the primitives in such a list of primitives within an area encompassed by the set of plural tiles that the list corresponds to, the method comprising:

using a primitive list for the scene to determine a set of primitives to be processed for a tile of the scene;

using the primitive distribution information associated with the primitive list to determine the primitives of the set of primitives in the primitive list to be processed for the tile; and processing the determined primitives to render the tile for display.

* * * * *